United States Patent
Qiu

(10) Patent No.: US 12,511,113 B2
(45) Date of Patent: Dec. 30, 2025

(54) SYSTEMS AND METHODS FOR AUTOMATED DRIVING HIGH PERFORMANCE COMPUTING

(71) Applicant: FCA US LLC, Auburn Hills, MI (US)

(72) Inventor: Haikuan Qiu, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 209 days.

(21) Appl. No.: 18/322,933

(22) Filed: May 24, 2023

(65) Prior Publication Data

US 2024/0394033 A1 Nov. 28, 2024

(51) Int. Cl.
| | |
|---|---|
| *G06F 9/44* | (2018.01) |
| *B60W 50/06* | (2006.01) |
| *B60W 60/00* | (2020.01) |
| *G06F 8/65* | (2018.01) |
| *B60W 30/06* | (2006.01) |
| *B60W 30/12* | (2020.01) |
| *B60W 30/14* | (2006.01) |
| *B60W 30/18* | (2012.01) |

(52) U.S. Cl.
CPC ............ *G06F 8/65* (2013.01); *B60W 50/06* (2013.01); *B60W 60/0015* (2020.02); *B60W 60/00253* (2020.02); *B60W 30/06* (2013.01); *B60W 30/12* (2013.01); *B60W 30/14* (2013.01); *B60W 30/18163* (2013.01); *B60W 2556/45* (2020.02)

(58) Field of Classification Search
CPC ........................................................ G06F 8/65
USPC ........................................................ 717/171
See application file for complete search history.

(56) References Cited

U.S. PATENT DOCUMENTS

| | | | |
|---|---|---|---|
| 10,602,329 B2 * | 3/2020 | Addepalli | H04W 40/20 |
| 11,288,373 B2 * | 3/2022 | Zhou | G05D 1/0088 |
| 11,955,008 B2 * | 4/2024 | Lisewski | G05D 1/0088 |
| 2019/0258251 A1 | 8/2019 | Ditty et al. | |
| 2020/0031371 A1 | 1/2020 | Soliman | |
| 2020/0372601 A1 * | 11/2020 | Lee | G06Q 50/40 |
| 2022/0126878 A1 * | 4/2022 | Moustafa | B60W 50/16 |
| 2024/0003708 A1 * | 1/2024 | Zhou | G01C 21/3881 |
| 2024/0045657 A1 * | 2/2024 | Ma | G06F 9/542 |

(Continued)

OTHER PUBLICATIONS

"The New Automotive Driving High Performance Computer"; retrieved from the Internet on Jan. 23, 2023; https://www.continental-automotive.com/Passenger-Cars/Autonomous-Mobility/Enablers/AD-High-Performance-Computer; 7 pages.

(Continued)

*Primary Examiner* — Evral E Bodden
(74) *Attorney, Agent, or Firm* — Jeremy J. Klobucar

(57) ABSTRACT

An automated driving high performance computing (AD HPC) system for a vehicle includes a base HPC layer including HPC hardware and an upper software layer above the base HPC layer, the upper software layer including an intermediate basic software layer including at least one operating system (OS) and middleware, and an upper application software layer above the intermediate basic software layer and including a set of autonomous driving features from level zero (L0) autonomous driving up to level five (L5) autonomous driving, wherein the AD HPC does not require distributed electronic control units (ECUs) or software designed for different hardware configurations thereby reducing implementation and update complexity.

20 Claims, 3 Drawing Sheets

(56) References Cited

U.S. PATENT DOCUMENTS

2024/0168747 A1* 5/2024 Klinemeier ............ G06F 9/542

OTHER PUBLICATIONS

"Tesla's next-gen Autopilot and infotainment hardware already in development: report"; retrieved from the Internet on Jan. 23, 2023; https://www.teslarati.com/tesla-autopilot-hardware-4-in-development-report/; 12 pages.

* cited by examiner

SYSTEMS AND METHODS FOR AUTOMATED DRIVING HIGH PERFORMANCE COMPUTING

FIELD

The present application generally relates to advanced driver assistance (ADAS) and autonomous driving and, more particularly, to systems and methods for automated driving high performance computing (AD HPC).

BACKGROUND

Today's vehicles are often equipped to perform a variety of advanced driver assistance (ADAS) and autonomous driving functions. The level of autonomous driving function ranges from level zero (L0), where there is little to no autonomous functionality, to level five (L5), where there could be fully autonomous functionality. The hardware of a vehicle could limit the level of autonomous driving functionality (L0 to L5) that it is capable of achieving. Thus, today's vehicles often include a plurality of distributed electronic control units (ECUs) that each control a particular set of vehicle systems and are configured to communicate with one another. This configuration is costly (e.g., multiple ECUs) and very complex (e.g., difficult to connect everything and to update software). Accordingly, while such conventional vehicle ADAS/autonomous driving systems may work well for their intended purpose, there exists an opportunity for improvement in the relevant art.

SUMMARY

According to one example aspect of the invention, an automated driving high performance computing (AD HPC) system for a vehicle is presented. In one exemplary implementation, the AD HPC system comprises a base HPC layer including HPC hardware and an upper software layer above the base HPC layer, the upper software layer comprising an intermediate basic software layer including at least one operating system (OS) and middleware, and an upper application software layer above the intermediate basic software layer and including a set of autonomous driving features from level zero (L0) autonomous driving up to level five (L5) autonomous driving, wherein the AD HPC does not require distributed electronic control units (ECUs) or software designed for different hardware configurations thereby reducing implementation and update complexity.

In some implementations, the AD HPC system further comprises an over-the-air (OTA) update feature configured to receive an OTA update including an update to at least one of the set of autonomous driving features. In some implementations, the OTA update includes a new autonomous driving feature for the set of autonomous driving features. In some implementations, the set of autonomous driving features includes L0 to L2+ autonomous driving features including (i) a set of active safety features, (ii) a set of parking features, (iii) adaptive cruise control (ACC), lane centering/changing, and hands-free driving. In some implementations, the set of autonomous driving features includes L3 to L5 autonomous driving features including at least one of (i) low speed attention free driving, (ii) piloted urban driving, and (iii) autonomous ride hailing.

In some implementations, the HPC hardware does not include distributed or separate ECUs for cameras, RADAR/LIDAR, parking, driving monitoring, and domain control. In some implementations, the HPC hardware includes at least one of an automotive microcontroller, system-on-chips (SOCs), controller area network (CAN) bus transceivers, local interconnect network (LIN) transceivers, Ethernet switches, dynamic memories, power supplies, and de-serializers. In some implementations, the at least one operating system includes a safety real-time OS (RT OS) and a general OS. In some implementations, the intermediate basic software layer includes both classic and adaptive Automotive Open System Architecture (AUTOSAR) platforms.

According to another example aspect of the invention, a method of implementing an automated driving high performance computing (AD HPC) system for a vehicle is presented. In one exemplary implementation, the method comprises providing a base HPC layer including HPC hardware and providing an upper software layer above the base HPC layer, the upper software layer comprising an intermediate basic software layer including at least one operating system (OS) and middleware, and an upper application software layer above the intermediate basic software layer and including a set of autonomous driving features from level zero (L0) autonomous driving up to level five (L5) autonomous driving, wherein the AD HPC does not require distributed electronic control units (ECUs) or software designed for different hardware configurations thereby reducing implementation and update complexity.

In some implementations, the method further comprises providing an over-the-air (OTA) update layer feature to receive an OTA update for at least one of the set of autonomous driving features. In some implementations, the OTA update includes a new autonomous driving feature for the set of autonomous driving features. In some implementations, the set of autonomous driving features includes L0 to L2+ autonomous driving features including (i) a set of active safety features, (ii) a set of parking features, (iii) adaptive cruise control (ACC), lane centering/changing, and hands-free driving. In some implementations, the set of autonomous driving features includes L3 to L5 autonomous driving features including at least one of (i) low speed attention free driving, (ii) piloted urban driving, and (iii) autonomous ride hailing.

In some implementations, the HPC hardware does not include distributed or separate ECUs for cameras, RADAR/LIDAR, parking, driving monitoring, and domain control. In some implementations, the HPC hardware includes at least one of an automotive microcontroller, system-on-chips (SOCs), controller area network (CAN) bus transceivers, local interconnect network (LIN) transceivers, Ethernet switches, dynamic memories, power supplies, and de-serializers. In some implementations, the at least one operating system includes a safety real-time OS (RT OS) and a general OS. In some implementations, the intermediate basic software layer includes both classic and adaptive Automotive Open System Architecture (AUTOSAR) platforms.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, today's vehicles often include a plurality of distributed electronic control units (ECUs) that each control a particular set of vehicle systems and are configured to communicate with one another. This configuration is costly (e.g., multiple ECUs) and very complex (e.g., difficult to connect everything and to update software) and therefore there exists an opportunity for improvement in the relevant art. In other words, increasing the number of ECUs can create additional technical difficulties when new ECUs have to talk to each other, and also leads to significant engineering, design, and development (ED&D) for both internal and external suppliers. Accordingly, improved systems and methods for automated driving high performance computing (AD HPC) are presented herein. These new systems and methods are a "one box" or consolidated solution that allows for L0 to L5 autonomous driving functionality without the costly and complex implementation of distributed ECUs.

The hardware for the entire AD HPC is packaged altogether in a single base high-performance computing (HPC) layer having a high-performance microcontroller (uC), system-on-chips (SOCs), and other components such as dynamic random-access memory (DRAM). A software stack atop the HPC layer, including a basic software layer including at least one operating system (OS) (e.g., a real-time safety OS, or RT OS, and a general OS) is implemented, and an application software layer is finally implemented at a top and includes a set of autonomous driving features from L0 up to L5. Another potential benefit is that software development can be focused on the same hardware and the software is able to receive over-the-air (OTA) updates, thereby improving the desirability to for consumers to subscribe to original equipment manufacturer (OEM) update services in order to receive new or latest ADAS/autonomous driving features.

Figure 1:
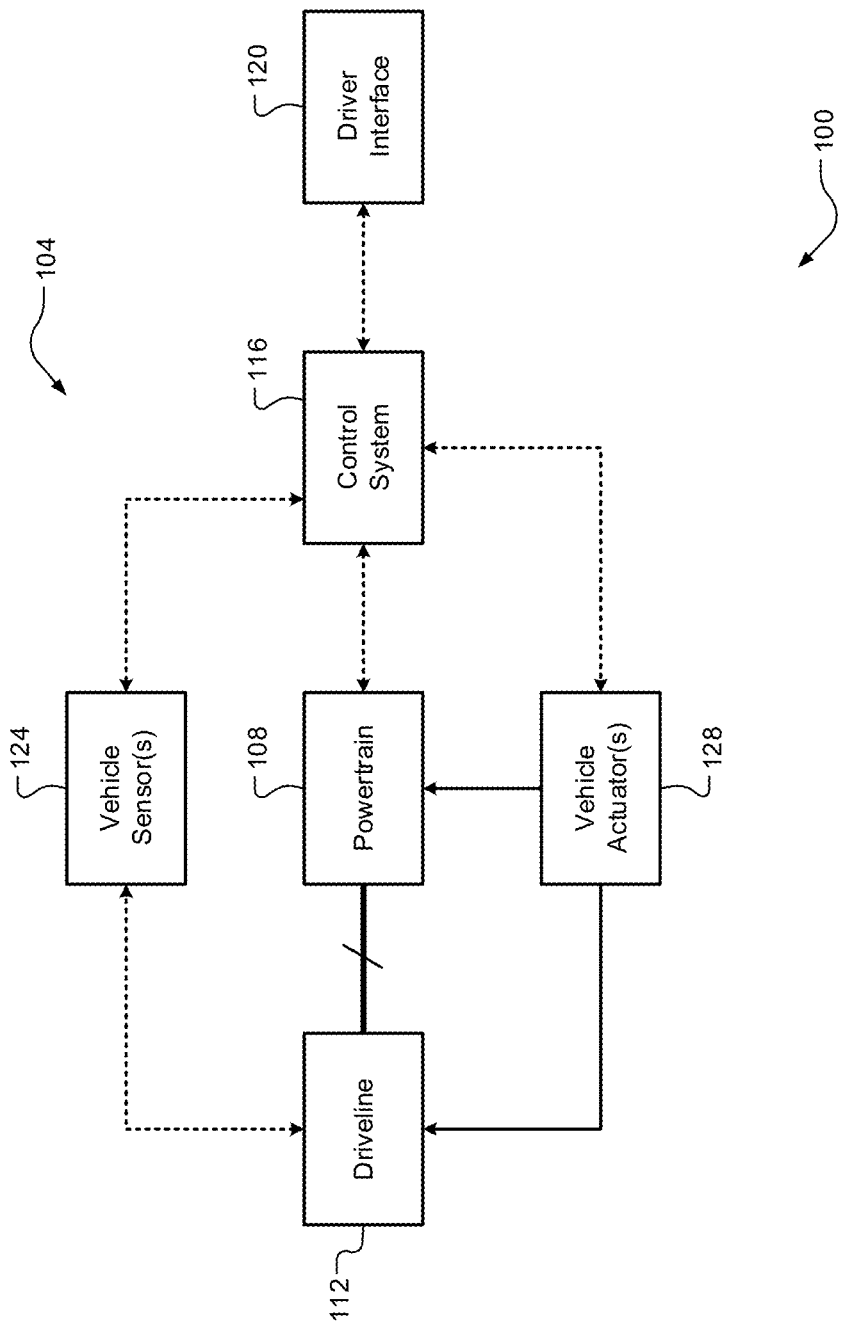
FIG. 1 is a functional block diagram of a vehicle having an automated driver assistance (ADAS) and autonomous driving system according to the principles of the present application.

Referring now to FIG. 1, a functional block diagram of a vehicle 100 having an example autonomous driving system 104 according to some implementations of the present application is illustrated. It will be appreciated that this is merely one example implementation of a vehicle and that the systems/methods of the present application are applicable to any suitable vehicle configured with autonomous driving features. The vehicle 100 is powered by a powertrain 108 that could be any suitable type of powertrain, from a conventional internal combustion engine (ICE) to a hybrid or fully-electrified vehicle (PHEV, FCEV, BEV, etc.) including battery system(s), a fuel cell system, electric motor(s), and combinations thereof. The powertrain 108 is configured to generate drive torque in any suitable manner (air/fuel in-cylinder combustion, electromagnetic rotation, etc.) and transfer the drive torque (e.g., via a manual or automatic transmission, not shown) to a driveline 112 for vehicle propulsion.

A control system 116 controls operation of the vehicle 100 and primarily, the powertrain 108, based on various inputs, such as to satisfy a drive torque request via a driver interface 120 (e.g., an accelerator pedal). The control system 116 includes or represents the AD HPC system of the present application and could further include at least some of the other illustrated components. For simplicity, a plurality of vehicle sensor(s) 124 and vehicle actuator(s) 128 are separately shown and are configured to monitor vehicle operating parameters and to control vehicle sub-systems, such as part of ADAS and autonomous driving features as previously described herein and as more fully described below. The autonomous driving system 104 generally references and includes the control system 116, the vehicle sensor(s) 124, and the vehicle actuator(s) 128.

In general, the AD HPC is configured to perform all of the various computational tasks required for the key aspects of autonomous driving, such as, but not limited to, perception, human vision, driving, and parking functions. It also provides a scalability of resources and hardware acceleration from L0-L5. In addition, it also ensures flexibility in the setup of a sensor suite (e.g., sensor(s) 124). This is being driven by the need for the increasing functionality concerning ADAS/autonomous driving, mainly from safety and perception functions. At present in conventional solutions, as previously described above, functionalities include decentralize systems for safety functions, which are expected to grow to the level of a centralized HPC for all functions hosting perception of satellite cameras in the future. Autonomous driving brings together numerous technologies and systems to enable the act of autonomy that is required of the vehicle to drive itself in the real-world. While there are five levels of autonomous driving (L0 to L5), even the first level L0 requires the integration of multiple sensors and systems.

It combines features of safety, connectivity, and human machine interface (HMI) to provide the desired output of sensing, planning, and acting to situations on the road. This combined effort of multiple systems calls for superior computing power, handling very large amounts of complex data. This single development can also thereafter provide for easy derivation of multiple solutions. Rather, the subsequent development can focus on the software development by having same hardware, without the need to development a new ECU or add additional ECUs for the higher level of autonomy. The AD HPC is also capable of doing OTA updating, meaning that the customer can continually receive new ADAS/autonomous driving feature versions or entirely new ADAS/autonomous driving features by subscribing to an update service offered and controller by a vehicle OEM. These AD HPCs, therefore, play a significant role in adopting new approaches to vehicle architectures and for the development of new/improved ADAS/autonomous driving features.

Figure 2:
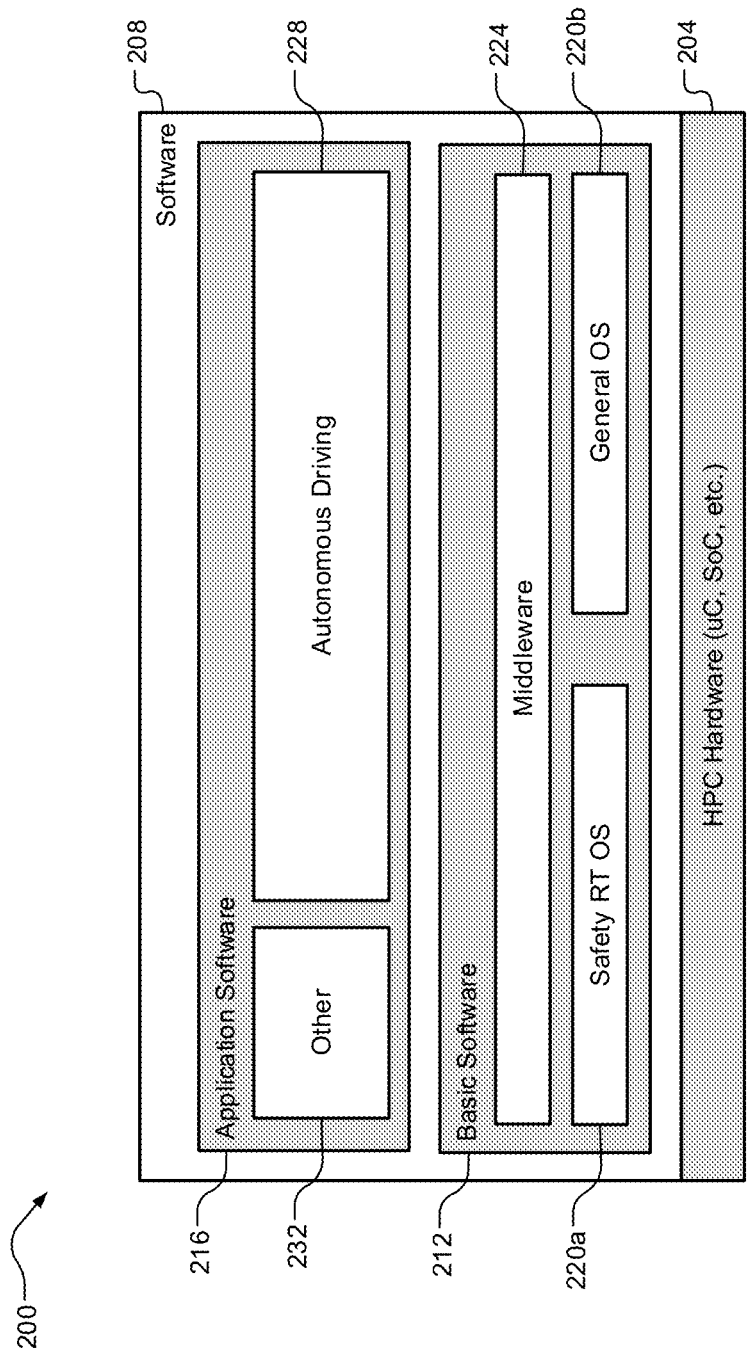
FIG. 2 is a stack diagram of an example automated driving high performance computing (AD HPC) system according to the principles of the present application.

Referring now to FIG. 2, a stack diagram of an example AD HPC system or architecture 200 according to the principles of the present application is illustrated. This example stack/architecture 200 could be implemented for the control system 116 of the vehicle 100 of FIG. 1, but it will also be appreciated that this stack/architecture 200 could be applicable to other suitable vehicles/controllers. A bottom or base HPC hardware layer 204 is provided and includes HPC components such as a high-performance microcontroller (uC), one or more system-on-chips (SOCs), and the like.

Non-limiting examples of the HPC components include an automotive microcontroller, SOCs, controller area network (CAN) bus transceivers, Ethernet switches, local interconnect network (LIN) transceivers, dynamic memories, power supplies, and de-serializers. As previously discussed, this stack/architecture 200 eliminates the need for distributed ECUs such as a camera ECU, RARAR/LIDAR ECU(s), a parking ECU, a driving monitoring ECU, and a domain controller ECU by consolidating all functions into one system/module 200, thereby also eliminating the need for software designed for different hardware configurations and thus reducing implementation and update complexity.

A software layer 208 is provided above the HPC hardware layer 204. This software layer 208 can generally be divided into basic software 212 and application software 216 at a top level. The basic software 212 is provided directly above the HPC hardware layer 204 and can include middleware and one or more operating system(s) using the classic AUTOSAR platform and the newer, higher-performance adaptive AUTOSAR platform (e.g., specialized for run-time adaptive applications for HPC applications). While the AUTOSAR open system architectures/platforms are specifically described herein, it will be appreciated that other suitable architectures or platform standards could be utilized. As shown, there are two OS's: a real-time safety OS (or RT OS) 220*a*, focused on ADAS/autonomous driving, and a general OS 220*b*. Middleware 224 is provided there above and is configured to interface between the OS's and the application software 216. The application software 216 can generally be divided into ADAS/autonomous driving software 228 (from level L0 up to and potentially including level L5) and other (i.e., non-ADAS/autonomous) software 232.

Non-limiting examples of ADAS/autonomous driving features are now listed/generally described. Active safety features include evasive steering assist, wrong way assist, give way warning, emergency stop assist, automatic emergency braking (AEB), car-to-car AEB, head-on collision AEB, pedestrian AEB, cyclist AEB, powered two-wheelers reverse pedestrian AEB, active rear cross-path AEB, junction assist blind spot monitor, blind spot monitor with trailer, high-speed overtaking, lane support system, active lane management, door bike alert pedal error prevention, drowsy driving detection, indirect distraction detection, direct traffic sign/speed limit information intelligent speed assist, and manual speed limiter vehicle-to-anything (V2X).

Parking features include front, rear and side park warning, parallel and perpendicular park and unpark, park assist with stop system, dually fender park-sense warning, park-sense based camera activation, rear view camera with dynamic gridlines and virtual wall, surround view camera system, 360 degree three-dimensional (3D) surround (bowl) view, full automated parking, full automated parking via remote, autonomous reverse driving, parallel park exit warning, front "tire-to-curb" view, clear path underbody view, front splitter park-sense warning, rear backup camera with tailgate in down position, valet and parking. L2 enhanced mid features include basic adaptive cruise control (ACC), enhanced ACC, L2 lane centering all roads, driver-initiated automatic lane change, active lane guidance, and L2 hands-free driving—low speed. L2+ highway assist features include L2 hands-free driving—high speed. L3 features include attention-free driving—low speed. L4-L5 features include urban piloted drive and autonomous ride hailing.

Figure 3:
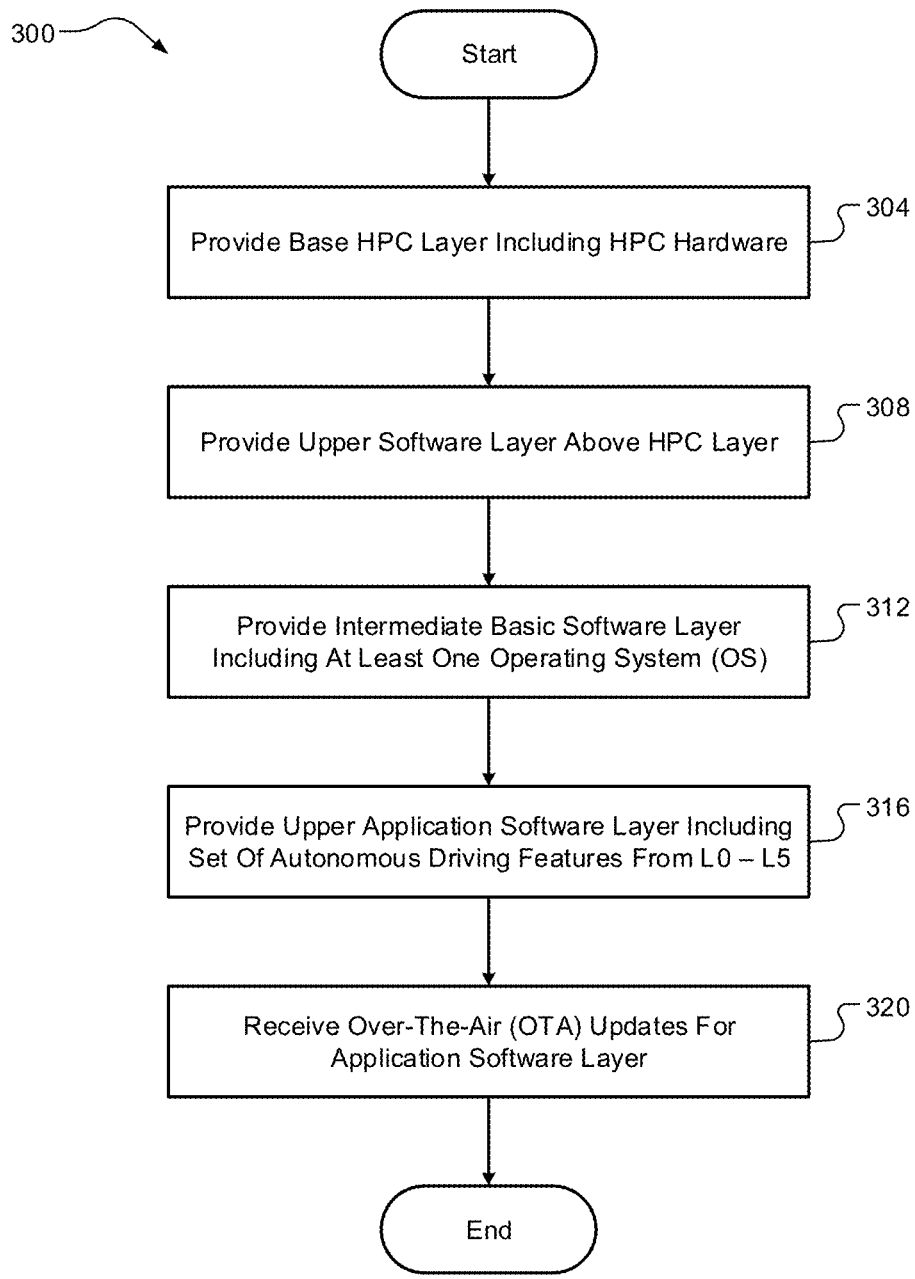
FIG. 3 is a flow diagram of an example method of providing an ADAS and autonomous driving system for a vehicle according to the principles of the present application.

Referring now to FIG. 3, a flow diagram of an example method 300 of providing an ADAS and autonomous driving system for a vehicle according to the principles of the present application is illustrated. While the description of this method 300 references vehicle 100 and its components, it will be appreciated that this method 300 could be applicable to any suitable vehicle. At 304, a base HPC layer including HPC hardware (uC, SOCs, etc.) is provided. At 308, an upper software layer is provided above the HPC layer. Operation 308 further includes operation 312, where an intermediate basic software layer including middleware and at least one OS (e.g., an RT OS and a general OS) is first provided, and operation 316, where an upper application software layer including a set of autonomous driving features (L0 up to L5) is provided there above. Finally, at 320, an OTA update feature is provided and configured to receive OTA updates for the application software layer (e.g., the autonomous driving feature(s)). The method 300 then ends or returns to 304 for one or more additional cycles, such as for additional manufacturing/implementations. It is also worth noting that from L3 to L5, two AD HPC systems/modules could be implemented for a conservative and more robust application, but it is still possible for L0-L5 with only one AD HPC system/module.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An automated driving high performance computing (AD HPC) system for a vehicle, the AD HPC system comprising:
    a set of sensors configured to measure operating parameters of the vehicle;
    a set of actuators configured to control operating parameters of the vehicle; and
    a single electronic control unit (ECU) in communication with the sets of sensors and actuators and including HPC hardware comprising at least a microcontroller, a system-on-chip (SoC), a dynamic random access memory (DRAM), and a set of communication transceivers, wherein the single electronic control unit defines:
        a base HPC layer including the HPC hardware; and
        an upper software layer above the base HPC layer, the upper software layer comprising:
            an upper application software layer including a set of autonomous driving features from level zero (L0) autonomous driving up to level five (L5) autonomous driving; and
            an intermediate basic software layer between the base HPC layer and the upper application software layer and including (i) both a general operating system (OS) and a real-time safety OS configured to execute at least some of the set of autonomous driving features and (ii) middleware configured to interface between the intermediate basic software layer and the upper application software layer, wherein the AD HPC does not require distributed ECUs or software designed for different hardware configurations thereby reducing implementation and update complexity.

2. The AD HPC system of claim 1, further comprising an over-the-air (OTA) update feature configured to receive an OTA update including an update to the upper application software layer including at least one of the set of autonomous driving features.

3. The AD HPC system of claim 2, wherein the OTA update includes a new autonomous driving feature for the set of autonomous driving features that was not previously developed for the vehicle.

4. The AD HPC of claim 3, wherein the new autonomous driving feature, after the OTA update, is level three (L3) or greater up to and including L5.

5. The AD HPC system of claim 1, wherein the set of autonomous driving features includes L0 to L2+ autonomous driving features including (i) a set of active safety features, (ii) a set of parking features, (iii) adaptive cruise control (ACC), lane centering/changing, and hands-free driving.

6. The AD HPC system of claim 5, wherein the set of autonomous driving features includes L3 to L5 autonomous driving features including at least one of (i) low speed attention free driving, (ii) piloted urban driving, and (iii) autonomous ride hailing.

7. The AD HPC system of claim 1, wherein the HPC hardware does not include distributed or separate ECUs for cameras, RADAR/LIDAR, parking, driving monitoring, and domain control.

8. The AD HPC system of claim 1, wherein the HPC hardware further includes at least one controller area network (CAN) bus transceivers, local interconnect network (LIN) transceivers, Ethernet switches, power supplies, and de-serializers.

9. The AD HPC system of claim 8, wherein the intermediate basic software layer includes both classic and adaptive Automotive Open System Architecture (AUTOSAR) platforms.

10. The AD HPC of claim 1, wherein the set of autonomous driving features include at least (i) a first autonomous driving feature between L0 and level two (L2) and (ii) a second autonomous driving feature of level three (L3) or greater up to and including L5.

11. A method of implementing an automated driving high performance computing (AD HPC) system for a vehicle, the method comprising:

providing a set of sensors configured to measure operating parameters of the vehicle and a set of actuators configured to control operating parameters of the vehicle; and providing a single electronic control unit (ECU) in communication with the sets of sensors and actuators and including HPC hardware comprising at least a microcontroller, a system-on-chip (SoC), a dynamic random access memory (DRAM), and a set of communication transceivers, wherein the single electronic control unit defines:

a base HPC layer including the HPC hardware; and
an upper software layer above the base HPC layer, the upper software layer comprising:

an upper application software layer above the intermediate basic software layer and including a set of autonomous driving features from level zero (L0) autonomous driving up to level five (L5) autonomous driving; and an intermediate basic software layer between the base HPC layer and the upper application software layer and including (i) both a general operating system (OS) and a real-time safety OS configured to execute at least some of the set of autonomous driving features and (ii) middleware configured to interface between the intermediate basic software layer and the upper application software layer, wherein the AD HPC does not require distributed electronic control units (ECUs) ECUs or software designed for different hardware configurations thereby reducing implementation and update complexity.

12. The method of claim 11, further comprising providing an over-the-air (OTA) update layer feature to receive an OTA update for the upper application software layer including at least one of the set of autonomous driving features.

13. The method of claim 12, wherein the OTA update includes a new autonomous driving feature for the set of autonomous driving features that was not previously developed for the vehicle.

14. The method of claim 12, wherein the set of autonomous driving features include at least (i) a first autonomous driving feature between L0 and level two (L2) and (ii) a second autonomous driving feature of level three (L3) or greater up to and including L5.

15. The method of claim 11, wherein the set of autonomous driving features includes L0 to L2+ autonomous driving features including (i) a set of active safety features, (ii) a set of parking features, (iii) adaptive cruise control (ACC), lane centering/changing, and hands-free driving.

16. The method of claim 15, wherein the set of autonomous driving features includes L3 to L5 autonomous driving features including at least one of (i) low speed attention free driving, (ii) piloted urban driving, and (iii) autonomous ride hailing.

17. The method of claim 15, wherein the new autonomous driving feature, after the OTA update, is level three (L3) or greater up to and including L5.

18. The method of claim 11, wherein the HPC hardware does not include distributed or separate ECUs for cameras, RADAR/LIDAR, parking, driving monitoring, and domain control.

19. The method of claim 11, wherein the HPC hardware further includes at least one of controller area network (CAN) bus transceivers, local interconnect network (LIN) transceivers, Ethernet switches, power supplies, and de-serializers.

20. The method of claim 19, wherein the intermediate basic software layer includes both classic and adaptive Automotive Open System Architecture (AUTOSAR) platforms.

* * * * *